(12) United States Patent
Simm et al.

(10) Patent No.: US 8,772,989 B2
(45) Date of Patent: Jul. 8, 2014

(54) HAND-HELD POWER TOOL

(75) Inventors: Robert Simm, Oekingen (CH); Bruno Sinzig, Walliswil bei Biederbipp (CH); Christian Ackermann, Ramiswil (CH)

(73) Assignee: Robert Bosch GmbH, Stuttgart (DE)

( * ) Notice: Subject to any disclaimer, the term of this patent is extended or adjusted under 35 U.S.C. 154(b) by 257 days.

(21) Appl. No.: 12/746,692

(22) PCT Filed: Nov. 25, 2008

(86) PCT No.: PCT/EP2008/066207
§ 371 (c)(1),
(2), (4) Date: Jun. 7, 2010

(87) PCT Pub. No.: WO2009/071474
PCT Pub. Date: Jun. 11, 2009

(65) Prior Publication Data
US 2010/0277015 A1 Nov. 4, 2010

(30) Foreign Application Priority Data
Dec. 7, 2007 (DE) .......................... 10-2007-059 119

(51) Int. Cl.
*H02K 7/14* (2006.01)
*H02K 5/16* (2006.01)

(52) U.S. Cl.
USPC .............................................. 310/50; 310/90

(58) Field of Classification Search
USPC ...................................................... 310/50, 90
See application file for complete search history.

(56) References Cited

U.S. PATENT DOCUMENTS

| | | | |
|---|---|---|---|
| 3,252,020 A | | 5/1966 | Consoli |
| 3,313,964 A | * | 4/1967 | Mattson et al. ................ 310/90 |
| 4,991,472 A | | 2/1991 | Hollingsworth |
| 5,014,563 A | * | 5/1991 | Isozumi .......................... 74/7 R |
| 5,170,851 A | * | 12/1992 | Kress et al. ..................... 173/29 |
| 5,196,727 A | * | 3/1993 | Isozumi et al. ................. 290/48 |
| 5,208,482 A | * | 5/1993 | Isozumi ........................... 290/48 |
| 6,152,249 A | * | 11/2000 | Li et al. ...................... 180/206.6 |
| 6,239,503 B1 | * | 5/2001 | Ikeda et al. ................ 290/38 R |
| 2007/0159030 A1 | * | 7/2007 | Naganuma et al. ......... 310/49 R |

FOREIGN PATENT DOCUMENTS

GB 2124937 A 2/1984

* cited by examiner

*Primary Examiner* — Tran Nguyen
*Assistant Examiner* — Alex W Mok
(74) *Attorney, Agent, or Firm* — Maginot, Moore & Beck

(57) ABSTRACT

The invention relates to an electric tool, in particular a hand-held electric tool, having a housing, which has a rear housing part and at least one front housing part arranged in front of the rear housing part in the longitudinal direction of the electric tool, and an electric drive motor having an armature shaft that extends in the longitudinal direction of the electric tool. The armature shaft is rotatably mounted together with a rear bearing arranged at the rear housing part. According to the invention, the rear bearing is designed as a fixed bearing.

18 Claims, 1 Drawing Sheet

HAND-HELD POWER TOOL

CROSS-REFERENCE TO RELATED APPLICATION

This application is a 35 USC 371 application of PCT/EP2008/066207 filed on Nov. 25, 2008.

BACKGROUND OF THE INVENTION

1. Field of the Invention

The invention relates to an electric power tool, in particular a hand-held electric power tool. The electric power tool has a housing, preferably composed of plastic, in a cup-shaped or tubular design. In other words, the housing has at least two housing parts adjacent to each other in the longitudinal direction of the electric power tool.

2. Description of the Prior Art

In housings of electric power tools, a distinction is drawn between a cup-shaped design (tubular design) and a shell design. In a shell design, the housing includes two housing shells, whose contact surfaces extend in the longitudinal direction of the electric power tool. In cup-shaped designs, the contact surfaces extend essentially transverse to the longitudinal span of the electric power tool—the housing parts are thus arranged not adjacent to each other in the transverse direction as in a shell design, but adjacent to each other in the longitudinal direction of the electric power tool. In cup-shaped designs, the armature shaft of an electric drive motor extending in the longitudinal direction of the electric power tool is supported in rotary fashion in its rear region by means of a rear bearing situated in the rear housing part. In a cup-shaped design, this rear bearing is embodied in the form of a movable bearing that is able to move in the axial direction relative to the armature shaft during operation of the electric power tool. As a result, the bulk of the bearing forces are absorbed by a larger-dimensioned front bearing, which is situated spaced apart from the rear bearing in the longitudinal direction of the armature shaft and is embodied in the form of a fixed bearing. In a cup-shaped design, the front bearing is embodied in the form of a roller bearing.

OBJECT AND ADVANTAGES OF THE INVENTION

The object of the invention is to produce an electric power tool in which it is possible for the front bearing of the armature shaft to be embodied with smaller dimensions.

The invention is based on the concept of having the rear bearing, which is for rotary support of the armature shaft and is situated in the vicinity of the rear housing part, be embodied not in the form of a movable bearing that can be moved in relation to the armature shaft as in the prior art, but rather in the form of a fixed bearing that is stationary in relation to the armature shaft. Because of the embodiment of the rear bearing in the form of a fixed bearing, it is able to support greater forces so that as a result, a front bearing spaced apart from the rear bearing in the longitudinal direction of the electric power tool can be dimensioned smaller, thus making it possible to save space in the front region of the armature shaft. Since this front region is preferably encompassed by a transmission compartment, the larger amount of installation space available offers new possibilities for transmission design. In a particularly preferable embodiment of the electric power tool, a commutator for electrically contacting an armature stack is situated axially between the armature stack on the armature shaft and the rear bearing. With an embodiment of the rear bearing in the form of a fixed bearing according to the invention, the electrical contacting by means of the commutator is improved, consequently improving overall suppression shielding and the electromagnetic compatibility (EMC) of the electric power tool. Preferably, the rear bearing is embodied in the form of an exclusively radial bearing. It is also possible, however, to implement an embodiment in the form of a combined radial/axial bearing for combined absorption of axial and radial forces.

In a particularly advantageous embodiment of the rear bearing, it is embodied in the form of a roller bearing in order to absorb powerful forces. Preferably, the roller bearing is a ball bearing equipped with a plurality of balls situated one after another in the circumference direction and arranged in a cage comprised of a radially inner raceway and a radially outer raceway. The radially inner raceway is preferably supported affixed to the armature shaft for co-rotation with it, whereas the outer raceway is supported in the radial direction, preferably on the rear housing part. In an embodiment that is preferable for implementing a fixed bearing, the outer raceway is additionally supported in both axial directions.

In a particularly advantageous modification of the electric power tool, in addition to the rear armature shaft bearing, a front bearing is provided for the rotary support of the armature shaft. In relation to the armature stack affixed to the armature shaft, this front bearing is preferably situated on the side remote from the rear bearing, particularly in the region of a transmission compartment.

In a modification of the invention, the front bearing is advantageously embodied without roller elements. It is preferably embodied in the form of a slide bearing, particularly in order to minimize the amount of space required. It is particularly possible to implement such an embodiment if the rear bearing embodied in the form of a fixed bearing is a roller bearing.

In an embodiment of the electric power tool that is preferable for reliably preventing a relative movement of the rear bearing in relation to the armature shaft, at least one support element, preferably made of plastic, is provided that has an axial support surface with which it rests against the rear bearing. In other words, the rear bearing is supported in the axial direction on the support surface of the at least one support element. Preferably, the at least one support element is embodied and/or situated in a way that prevents a movement of the rear bearing in the direction toward the armature stack of the armature shaft. The embodiment of the at least one support element as partially or completely composed of plastic makes it easily possible to implement a damping function.

In a particularly advantageous embodiment of the support element, the outline of the longitudinal cross section is at least approximately L-shaped; the support element whose longitudinal cross section has an L-shaped outline has one leg that extends inward in the radial direction and constitutes the support surface for the axial support of the rear bearing. Preferably, the support surface here has a semicircular outline. In other words, the support surface is situated on an inner end surface of the support element oriented toward the rear bearing, i.e. away from the armature stack.

In an embodiment of the electric power tool that is preferable for assuring an exact and fixed positioning of the at least one support element in the electric power tool, the at least one support element is embodied in the form of a detent element that can be locked in detent fashion in or on the rear housing part. For this purpose, the support element preferably has a detent projection facing radially outward and/or at least one detent recess facing radially inward for cooperation with a corresponding detent region of the housing.

In a particularly preferred embodiment of the electric power tool, the rear housing part is embodied in the form of a housing cover that can be placed onto the at least one preferably cup-shaped or tubular front housing part. In this case, the housing cover can be embodied as essentially plate-shaped. In a particularly preferred embodiment, the rear housing part has a (rear) bottom section and in at least some regions, has a circumference wall extending in both the longitudinal direction of the electric power tool and the circumference direction. It is also possible to implement an embodiment with a continuous circumference wall. In this embodiment, the rear housing part is embodied as trough-like.

A particularly advantageous embodiment is not just provided with a single support element, but is instead provided with a plurality of support elements for axially supporting the rear bearing, which are preferably spaced uniformly apart from one another in the circumference direction. In a particularly preferred embodiment, the electric power tool has two such support elements that are preferably embodied and/or situated mirror-symmetrically to each other. In a particularly preferred embodiment, the two support elements are embodied in the form of detent elements for engaging in detent fashion with at least one projection and/or at least one recess of the rear housing part.

In an embodiment that is preferable for avoiding a movement of the rear bearing relative to the armature shaft in a rearward direction oriented away from the armature stack, the rear bearing is situated with its rear surface resting directly against the rear housing part. Preferably, the bearing also rests against the rear housing part in the radial direction. In order to accommodate the rear bearing in a supporting fashion on or in the rear housing part, a boss is preferably formed onto the rear housing part, preferably onto a bottom section of the rear housing part, and at least partially encloses the rear bearing in both the axial direction and the circumference direction.

BRIEF DESCRIPTION OF THE DRAWINGS

Other advantages and suitable embodiments can be inferred from the description of the figures, and from the drawings.

DESCRIPTION OF THE PREFERRED EMBODIMENT

Figure 1:
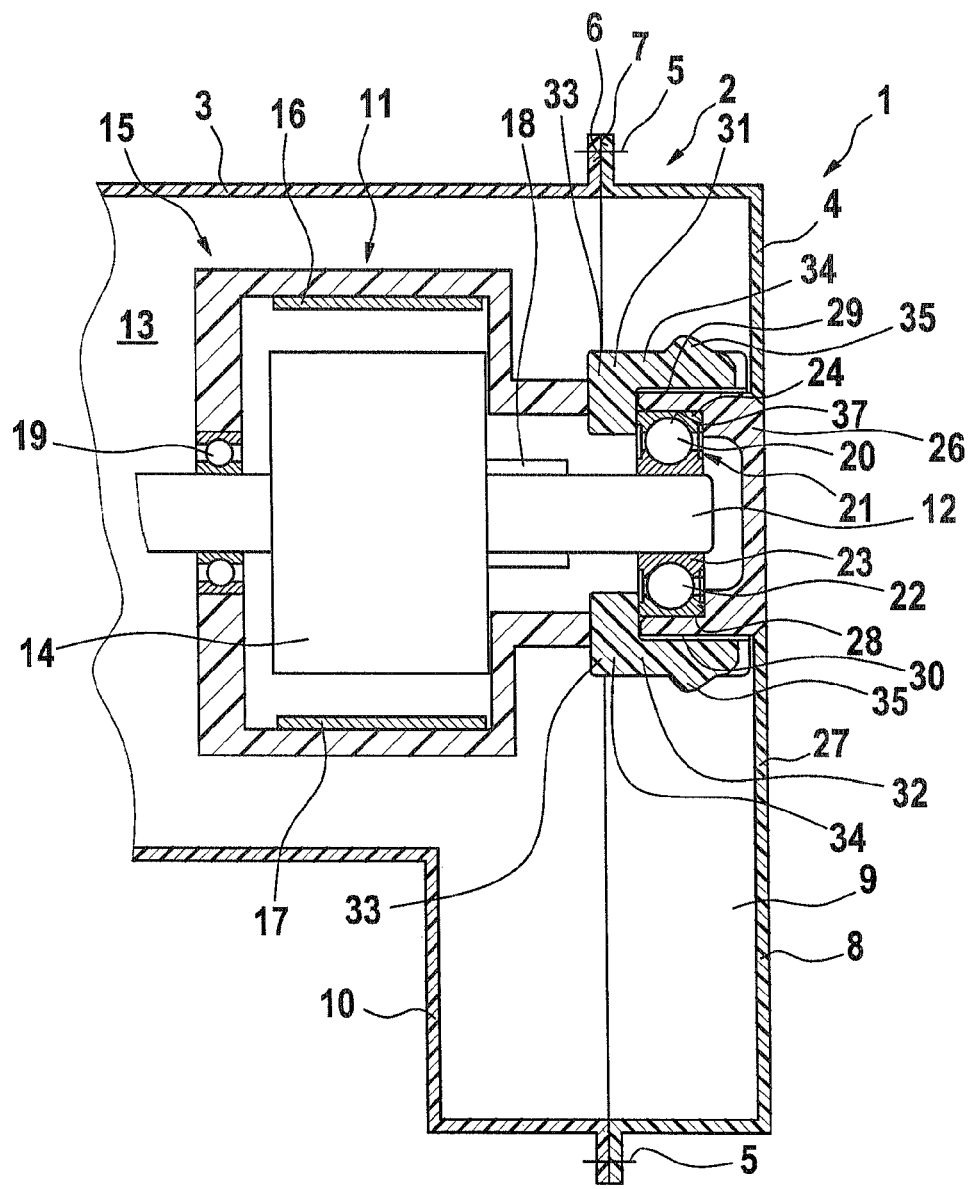
FIG. 1 shows a very schematic longitudinal section through part of an electric power tool with a housing embodied in the form of a cup.

In the drawings, components that are the same or function in the same way have been provided with the same reference numerals.

FIG. 1 shows a very schematic longitudinal section through a rear section of an electric power tool 1 embodied in the form of a hand-held electric power tool. The electric power tool 1 has a housing 2 embodied in a so-called cup-shaped or tubular design. The housing 2 is composed of a front housing part 3 that is tubular or cup-shaped and a rear housing part 4 that is adjacent to the front housing part 3 in the longitudinal direction. The rear housing part 4 is embodied in the form of a housing cover and is fastened to the front housing part 3 with the aid of fastening screws 5 that extend essentially in the longitudinal direction of the electric power tool 1. The housing parts 3, 4 rest against each other at contact surfaces 6, 7 extending in the circumference direction, transverse to the longitudinal span of the electric power tool 1. The two housing parts 3, 4 are embodied in the form of injection molded plastic parts. In a section toward the bottom in the plane of the drawing, the rear housing part 4 constitutes a rear section 8 of a handle 9, while a front section 10 of the handle 9 is constituted by the front housing part 3.

Inside the housing 2 an electric drive motor 11 is provided, which is equipped with an armature shaft 12 that extends in the longitudinal direction of the electric power tool 1 and is supported in rotary fashion. The armature shaft 12 is able to either directly drive a tool such as a drill bit or to drive a tool holder for accommodating a tool such as a drill bit. Alternatively, a transmission, not shown, is provided in a transmission compartment 13 between the tool or tool holder and the armature shaft 12. The transmission compartment 13 is situated in the front tubular housing part 3, in front—viewed in the longitudinal direction of the electric power tool 1—of an armature stack 14, which is mounted on the armature shaft 12 for co-rotation with it and is equipped with an armature winding that is not shown for the sake of clarity.

The armature stack 14 is encompassed by an inner motor housing 15 that is embodied as integral to the housing 2. Radially outside the armature stack 14, the inner motor housing 15 supports two permanent magnets 16, 17 of the drive motor 11, which are situated on opposite sides from each other.

On the right side of the armature stack 14 in the plane of the drawing, a very schematically depicted commutator 18 is provided for electrically contacting the armature stack 14; the electrical contacts (carbon brushes) are not shown for the sake of clarity.

On the left side of the armature stack 14 in the plane of the drawing, i.e. on the front side, a front bearing 19 embodied in the form of a slide bearing is provided to absorb axial and radial forces. In the exemplary embodiment shown, the front bearing 19 is constituted by or situated on the inner motor housing 15.

On the rear side of the armature stack 14, spaced axially apart from it and adjacent to the commutator 18, a rear bearing 20 is provided for the rotary support of the armature shaft 12. The rear bearing 20, embodied in the form of a roller bearing (a ball bearing in this case) is embodied in the form of a fixed bearing, i.e. has a fixed relative position in relation to the armature shaft 12. The rear bearing 20 in the exemplary embodiment shown is composed of a cage 21 for a plurality of balls 22 arranged so that they roll in the circumference direction, which are situated in raceways composed of a radially inner raceway 23 and a radially outer raceway 24. The two raceways 23, 24 are affixed to each other by struts (not enumerated) extending in the radial direction.

Preferably by means of a press-fitted seating, the inner raceway 23 is affixed to the armature shaft 12 for co-rotation with it while the outer raceway 24 is supported in the radially outward direction and in both axial directions (longitudinal directions) against parts of the electric power tool 1 that will be explained below.

In the axial direction toward the rear, the radially outer raceway 24 of the rear bearing 20 rests against a bowl-shaped boss 26, which extends from a bottom section 27 of the rear housing part 4 in the longitudinal direction of the electric power tool 1. To axially support the radially outer raceway 24, a circumferential annular shoulder 28 is embodied in the boss 26. In the radially outer direction, the radially outer raceway 24 is supported against a circumference wall section 29 of the boss 26. In other words, the rear bearing 20 is situated in a recess 30 in the boss 26.

Figure 2:
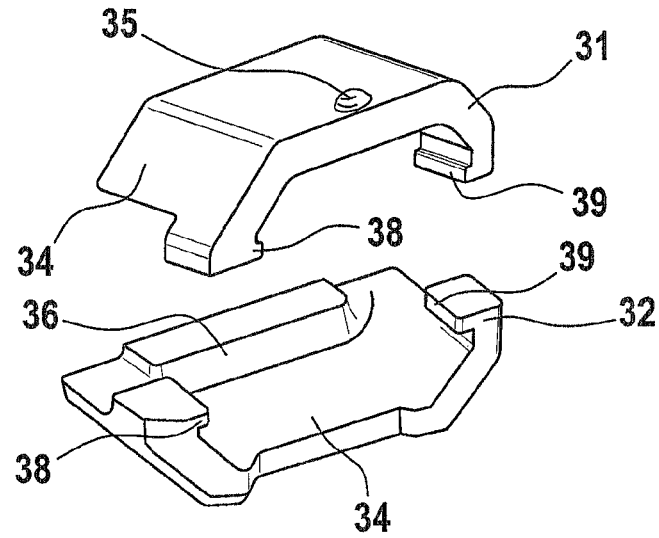
FIG. 2 shows two shell-like support elements made of plastic for axially supporting a rear bearing, shown in FIG. 1, that is provided to support an armature shaft in rotary fashion in the housing of the electric power tool.

On the side opposite from the annular shoulder 28, the recess 30 is closed in some regions by two shell-like support elements 31, 32 that are spaced apart from each other in the vertical direction of the electric power tool 1 and are shown in a perspective view in FIG. 2.

As is clear from FIG. 1, the support elements 31, 32 have an at least approximately L-shaped outline viewed in the longitudinal cross section and each have one leg 33 oriented radially inward and one leg 34 extending rearward in the axial direction at right angles to the leg 33. The support elements 31, 32 are embodied in the form of detent elements and each have a respective detent projection 35 situated on the leg 34 and facing radially outward, which cooperates in detent fashion with a recess, not shown, in the rear housing part 4. The support elements 31, 32 spaced apart from each other encompass regions of the boss 26 in such a way that the respective legs 34 each rest radially against the outside of circumferential region 29 of the boss. The leg 33 extending inward in the radial direction protrudes beyond the recess 30 in some regions in such a way that the rear bearing 20 rests with its radially outer raceway 24 against the inner end surface 36 of each support element 31, 32. In other words, the inner end surfaces 36 in a radially inner region, each constitute a respective support surface 37 for axially supporting the radially outer raceway 24. Consequently, the rear bearing 20 is enclosed in the axial direction between the legs 33 and the annular shoulder 28 of the boss 26, thus advantageously preventing an axial relative movement of the rear bearing 20 in relation to the armature shaft 12.

FIG. 2 shows a perspective view of the support elements 31, 32 in their installed position. The drawing shows the legs 33, 34 extending essentially at right angles to each other and the detent projection 35 facing radially outward. The support elements 31, 32 also have two rear detent projections 38, 39 facing radially inward for cooperating with corresponding recesses, not shown, in the boss 26 of the rear housing part 4.

The foregoing relates to the preferred exemplary embodiment of the invention, it being understood that other variants and embodiments thereof are possible within the spirit and scope of the invention, the latter being defined by the appended claims.

The invention claimed is:

1. An electric power tool, in particular an electric hand-held power tool, comprising:
    a housing that has a rear housing part including a first contact surface and a front housing part including a second contact surface, the front housing part being situated in front of the rear housing part in a longitudinal direction of the electric power tool wherein the first contact surface contacts the second contact surface, the rear housing part including an integral interior shoulder and an integral interior circumferential wall that collectively defines a mounting recess;
    an electric drive motor equipped with an armature shaft extending in the longitudinal direction of the electric power tool, the electric motor being supported by the rear housing part and the front housing part;
    a rear bearing situated in the mounting recess of the rear housing part and supporting the armature shaft in rotary fashion, wherein the integral interior shoulder axially supports the rear bearing and the interior circumferential wall radially supports the rear bearing; and
    two support elements configured to be embodied and/or situated mirror-symmetrically to each other,
    wherein at least one of the two support elements includes an integral axial support surface for supporting the rear bearing,
    wherein the rear housing part comprises a boss integrally formed in the rear housing part,
    wherein the boss includes the interior circumferential wall, and
    wherein a first support element and a second support element of the two support elements each rest on the boss, the first support element being spaced from and in non-contacting relation with the second support element.

2. The electric power tool as recited in claim 1, wherein the rear bearing is embodied in the form of a roller bearing comprising a ball bearing.

3. The electric power tool as recited in claim 2, further comprising a front bearing configured to support the armature shaft and is supported by the front housing part, the front bearing being spaced apart from the rear bearing on a side of an armature stack remote from the rear bearing.

4. The electric power tool as recited in claim 3, wherein the front bearing is embodied in the form of a slide bearing.

5. The electric power tool as recited in claim 1, further comprising a front bearing configured to support the armature shaft and being supported by the front housing part, the front bearing being spaced apart from the rear bearing on a side of an armature stack remote from the rear bearing.

6. The electric power tool as recited in claim 5, wherein the front bearing is embodied in the form of a slide bearing.

7. The electric power tool as recited in claim 5 further comprising an inner motor housing integral with the front housing part, wherein the armature stack is supported by the inner motor housing.

8. The electric power tool as recited in claim 7 further comprising at least one magnet disposed radially outside the armature stack and supported by the inner motor housing.

9. The electric power tool as recited in claim 1, wherein at least one of the two support elements comprises plastic.

10. The electric power tool as recited in claim 1, wherein at least one of the two support elements includes (i) an integral exterior surface that defines a detent element that is configured to be fixed in relation to the rear housing part, and (ii) an integral interior surface configured to support both the rear bearing and the rear housing part.

11. The electric power tool as recited in claim 10, wherein:
    the at least one of the two support elements has an at least approximately L-shaped outline, viewed in a longitudinal cross section,
    the support surface is embodied on a leg of the at least one of the two support elements, and
    the leg extends radially inward.

12. The electric power tool as recited in claim 1, wherein:
    at least one of the two support elements has an at least approximately L-shaped outline, viewed in a longitudinal cross section,
    the support surface is embodied on a leg of the at least one of the two support elements, and
    the leg extends radially inward.

13. The electric power tool as recited in claim 12, wherein at least one detent lug and/or detent recess is integral with and provided on an axially extending leg of the at least one of the two support elements.

14. The electric power tool as recited in claim 1, wherein at least one of the two support elements extends longitudinally, and is configured to axially support the rear bearing.

15. The electric power tool as recited in claim 14, wherein the circumferential wall extends from the shoulder longitudinally toward the electric drive motor.

16. The electric power tool as recited in claim 15, wherein an axially extending leg of the at least one of the two support elements extends from the electric drive motor longitudinally along the rear housing part.

17. The electric power tool as recited in claim 1 wherein each of the first support and the second support elements include respectively a first detent element and a second detent element, wherein the first detent element and the second detent element cooperate with a corresponding detent region of the rear housing part.

18. The electric power tool as recited in claim 1 wherein:
the integral interior shoulder axially supports and is in direct contact with the rear bearing, and
the interior circumferential wall radially supports and is in direct contact with the rear bearing.

* * * * *

UNITED STATES PATENT AND TRADEMARK OFFICE
CERTIFICATE OF CORRECTION

| | | |
|---|---|---|
| PATENT NO. | : 8,772,989 B2 | Page 1 of 1 |
| APPLICATION NO. | : 12/746692 | |
| DATED | : July 8, 2014 | |
| INVENTOR(S) | : Simm et al. | |

It is certified that error appears in the above-identified patent and that said Letters Patent is hereby corrected as shown below:

On Title Page Item (75)

Delete "Bruno Sinzig, Walliswil bei Biederbipp (CH);"

and insert --Bruno Sinzig, Walliswil bei Niederbipp (CH);-- in its place.

Signed and Sealed this
Ninth Day of December, 2014

Michelle K. Lee
*Deputy Director of the United States Patent and Trademark Office*